March 17, 1953  C. T. BANKS  2,631,767
PACKAGING MACHINE
Filed Feb. 21, 1948  13 Sheets-Sheet 1
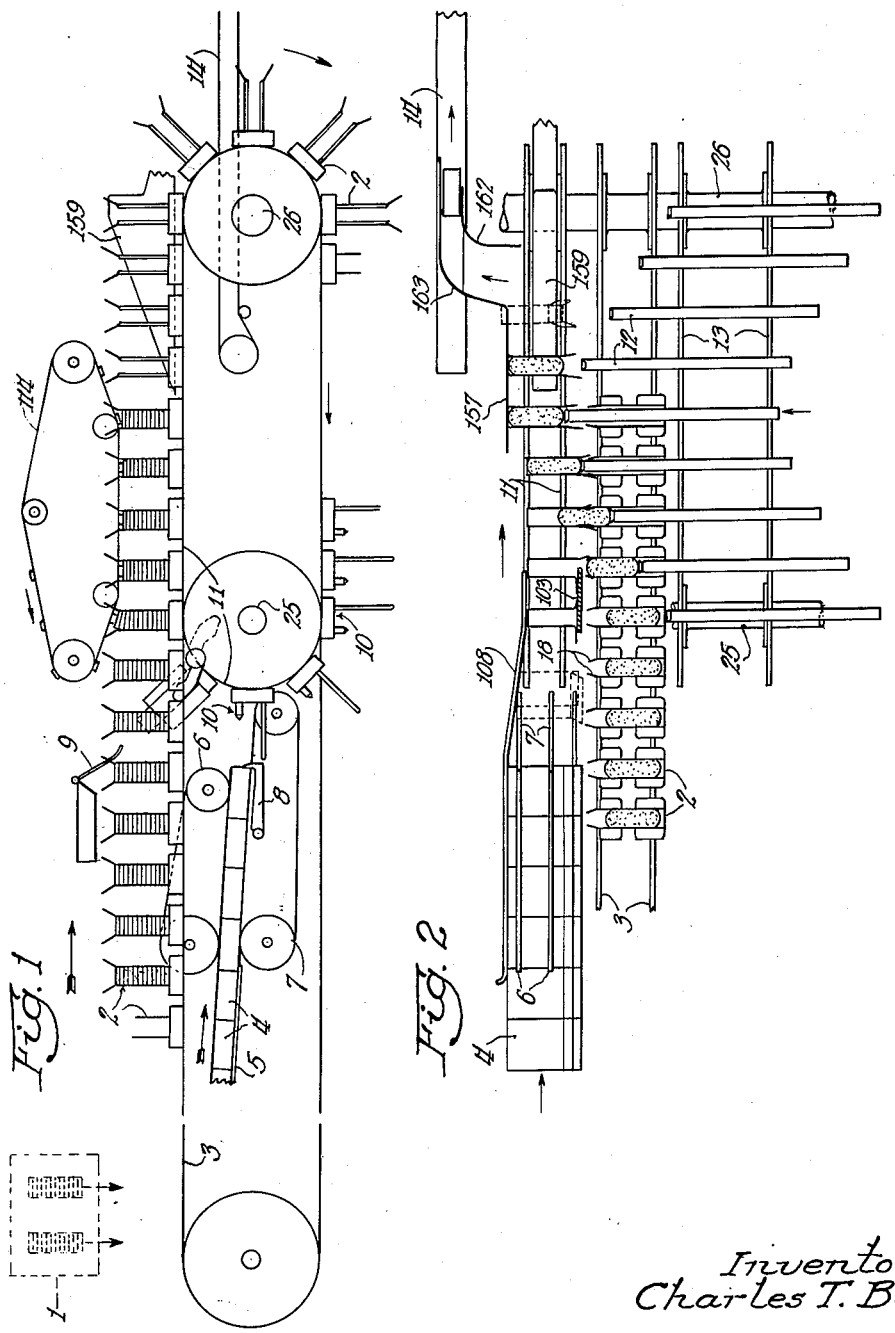
Inventor:
Charles T. Banks
By: Soans, Pond & Anderson
Attys.

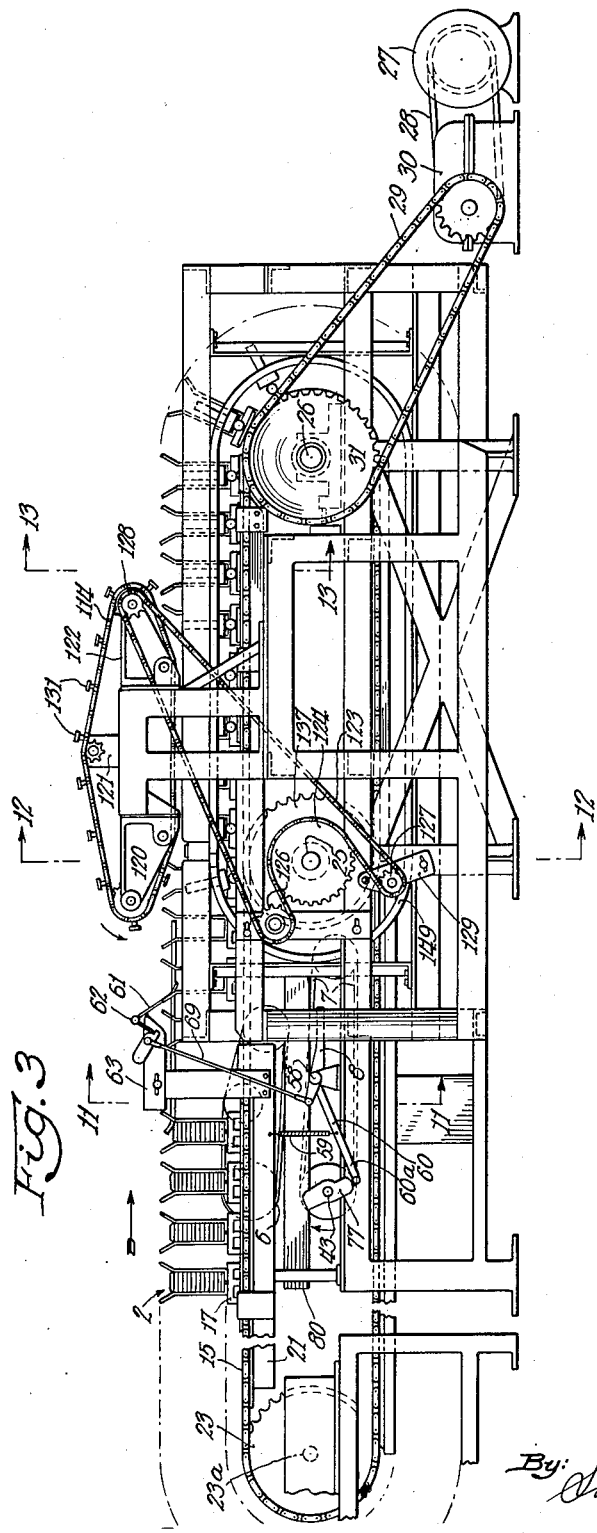

March 17, 1953  C. T. BANKS  2,631,767
PACKAGING MACHINE
Filed Feb. 21, 1948  13 Sheets-Sheet 3
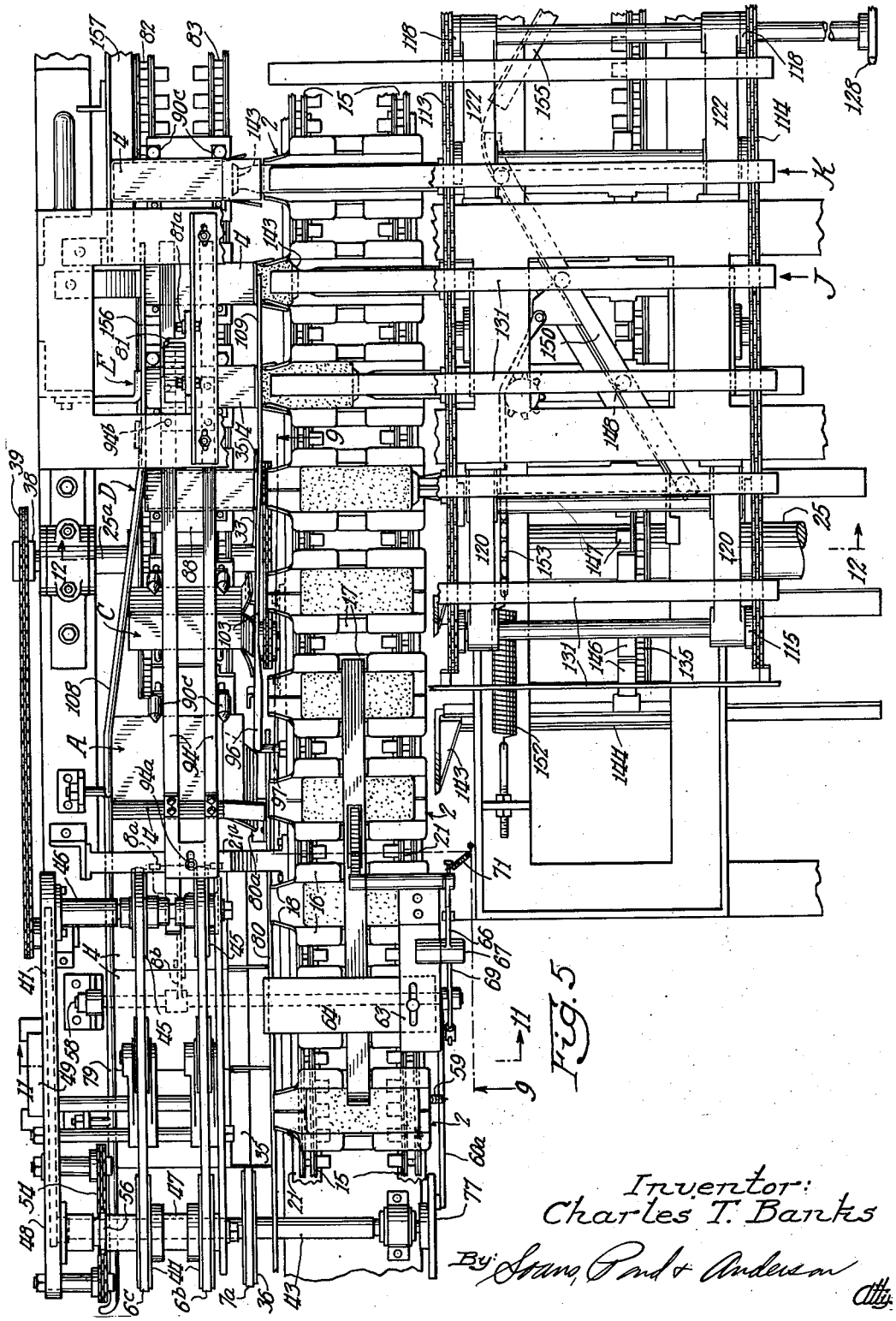

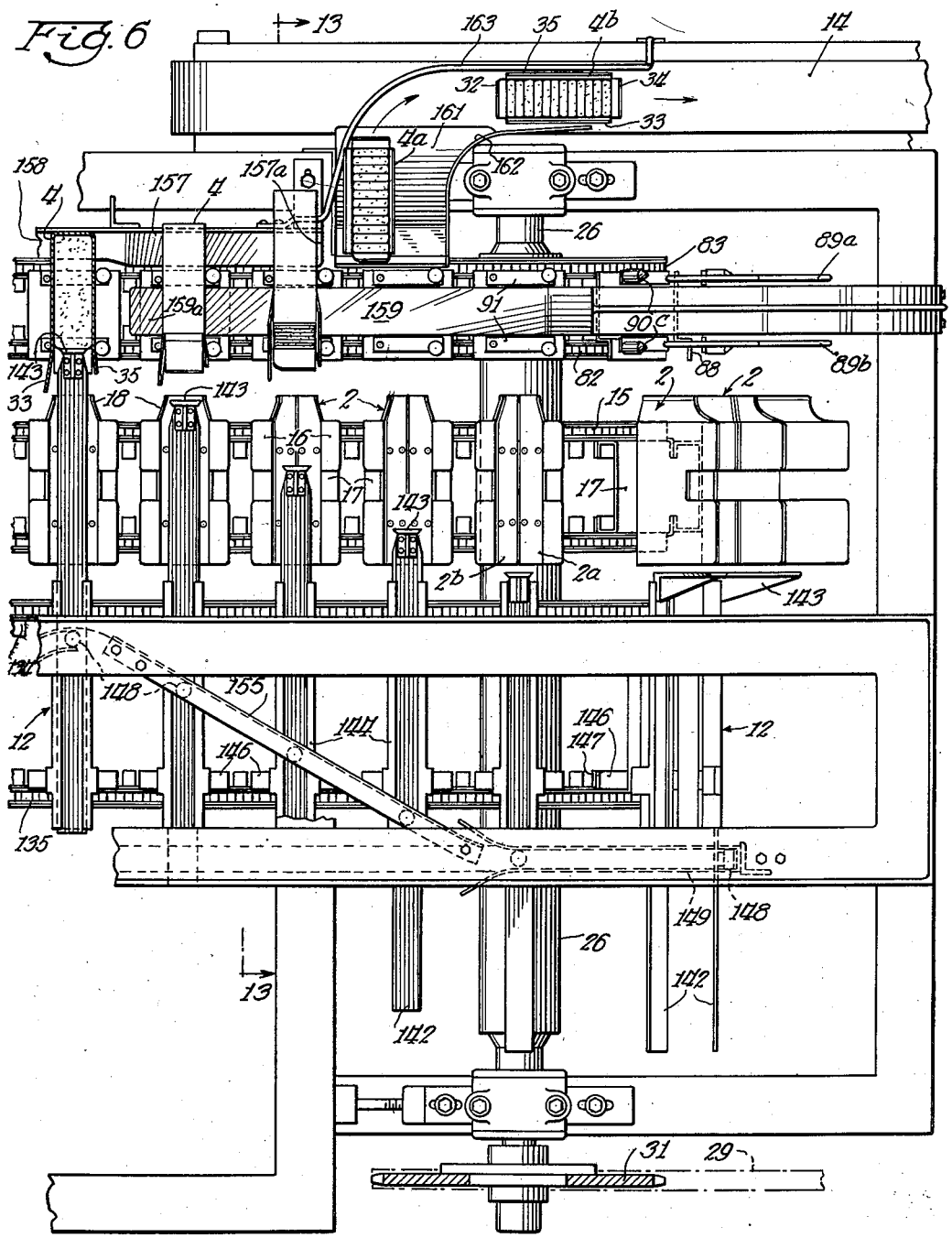

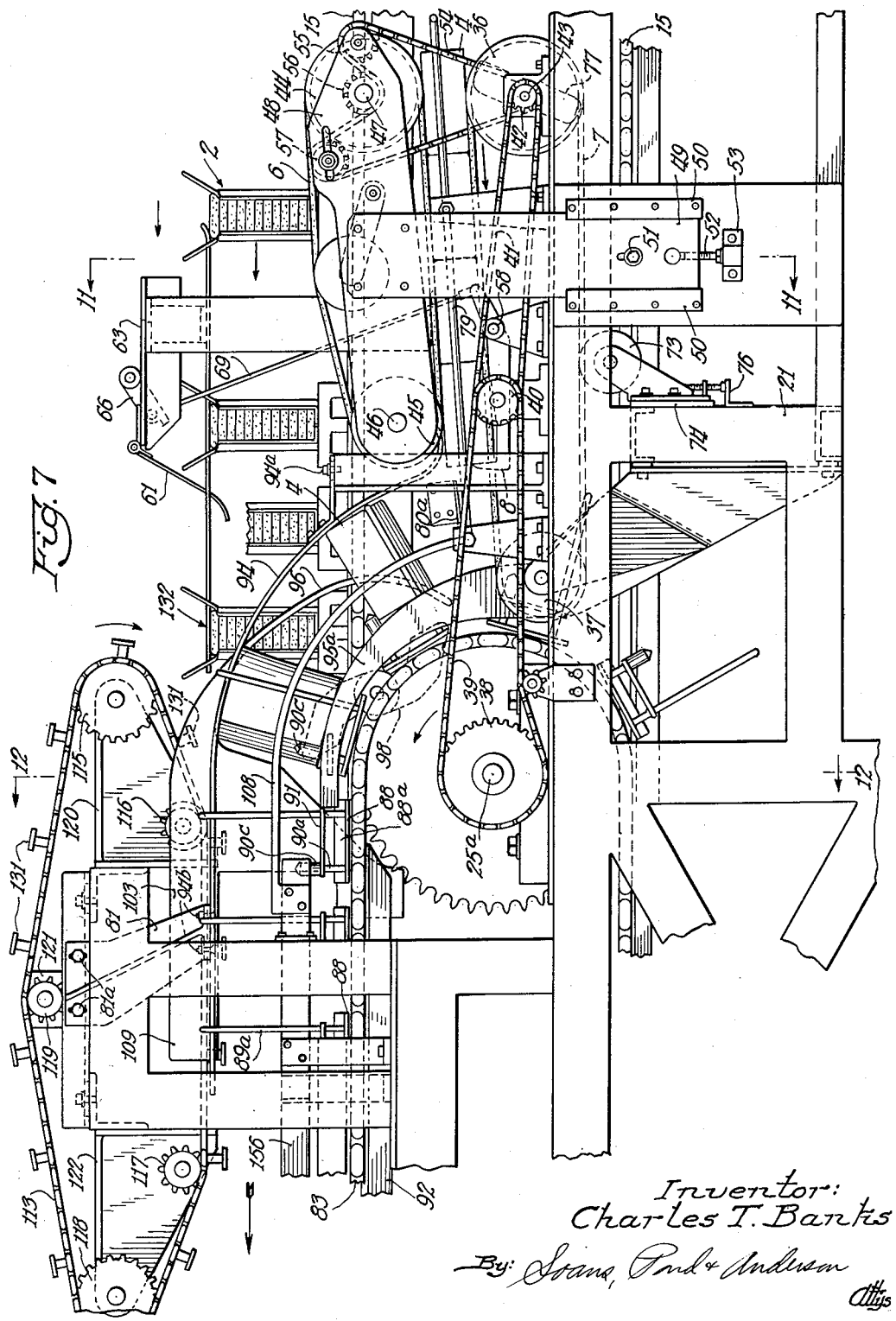

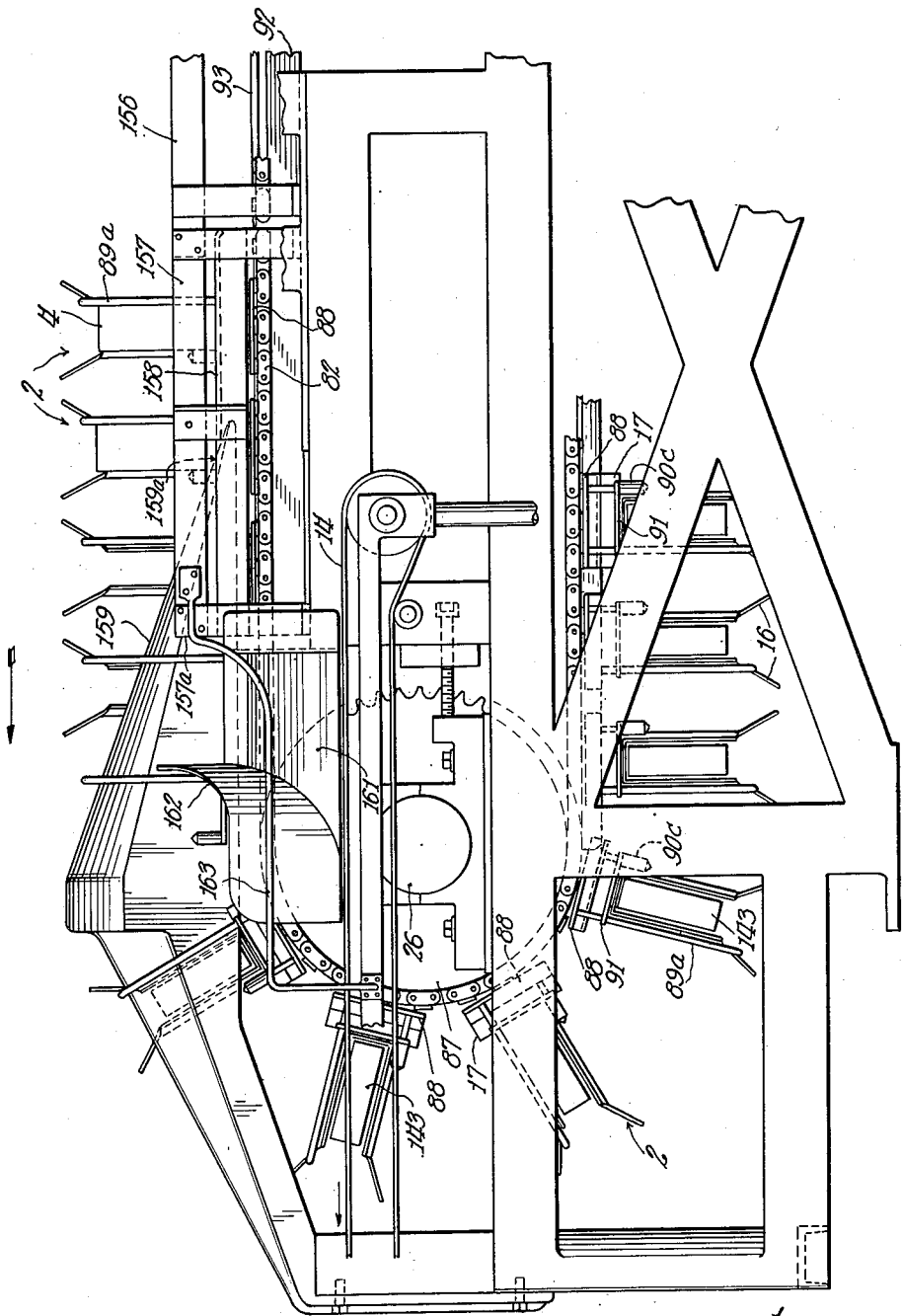

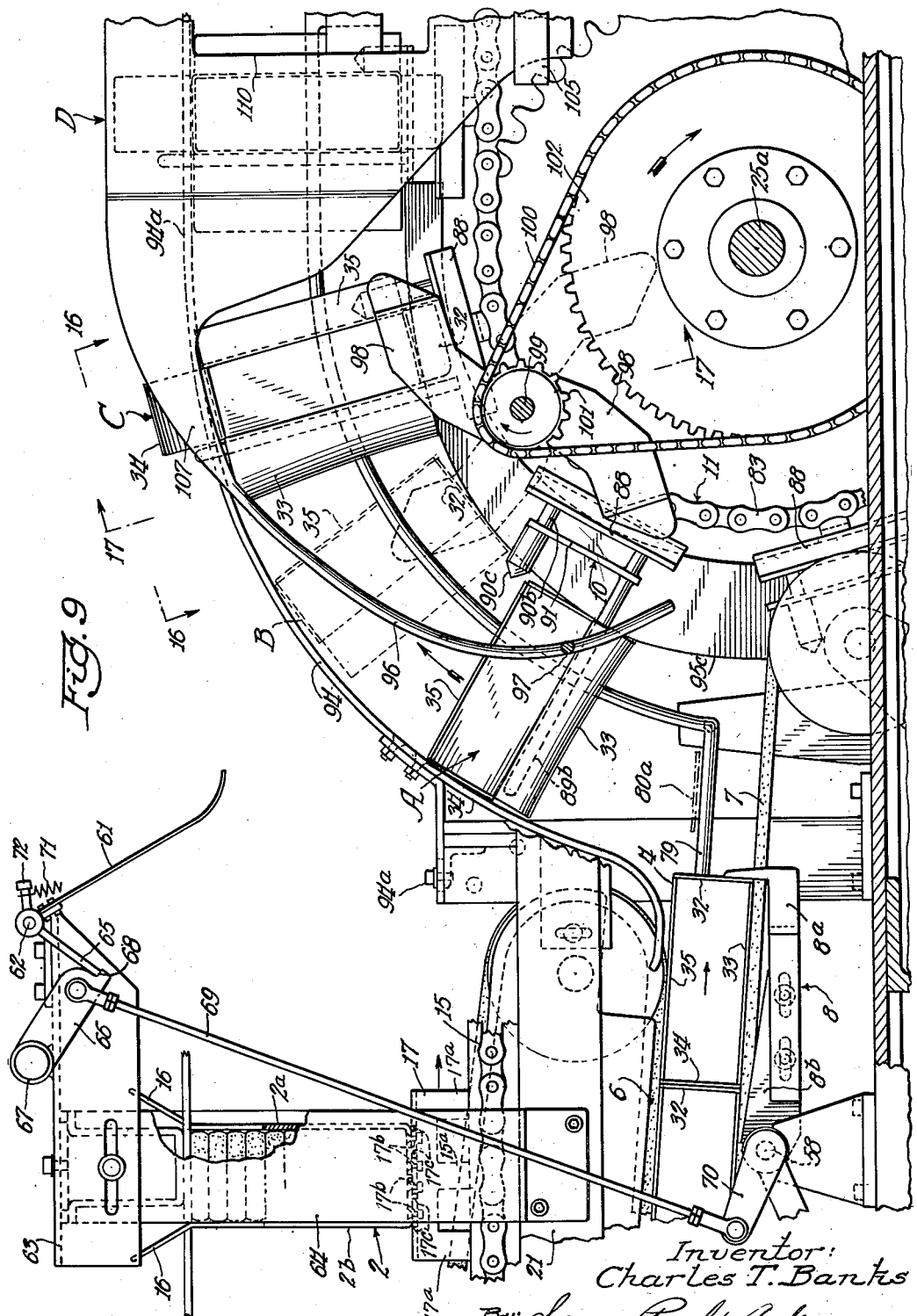

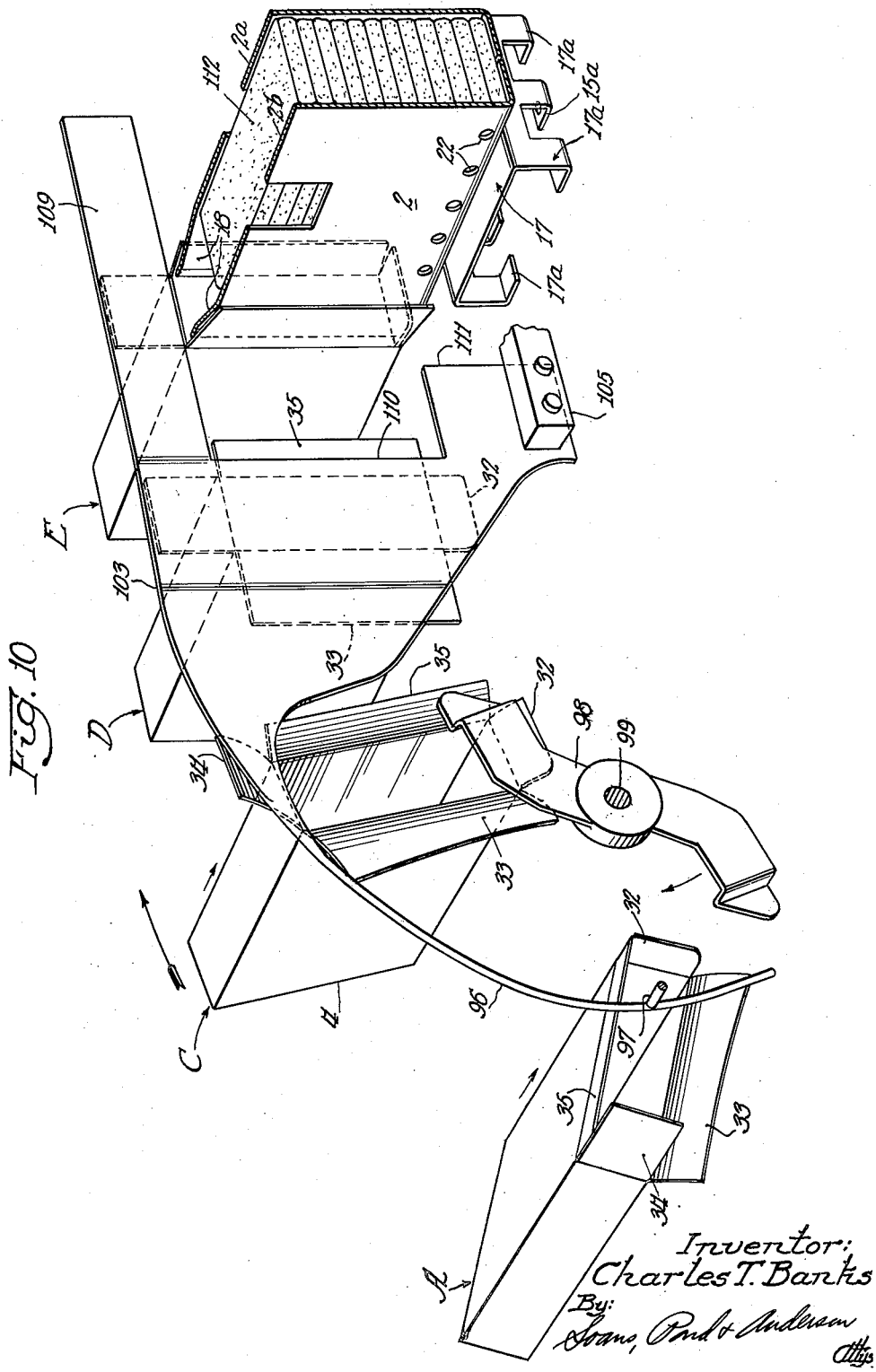

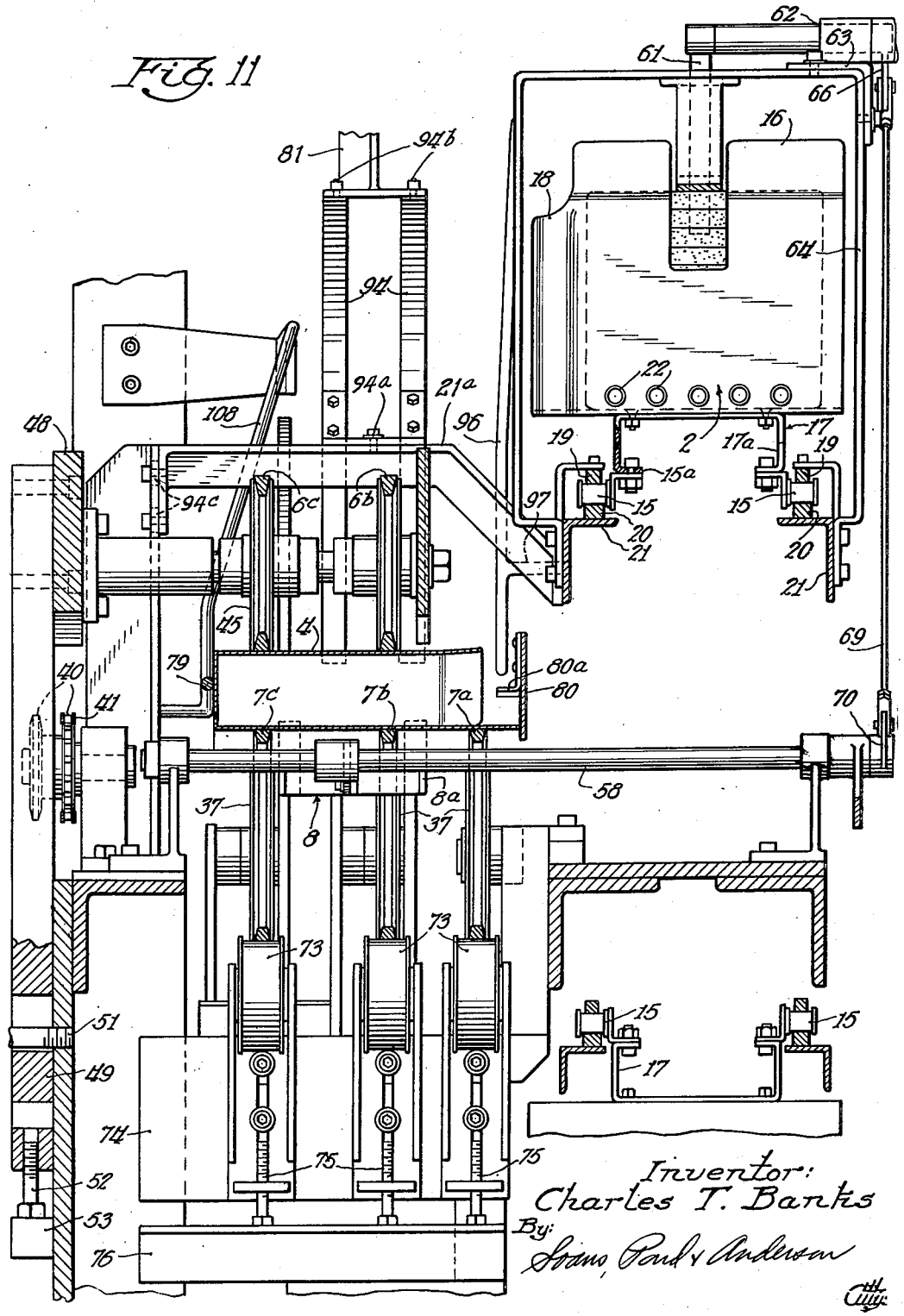

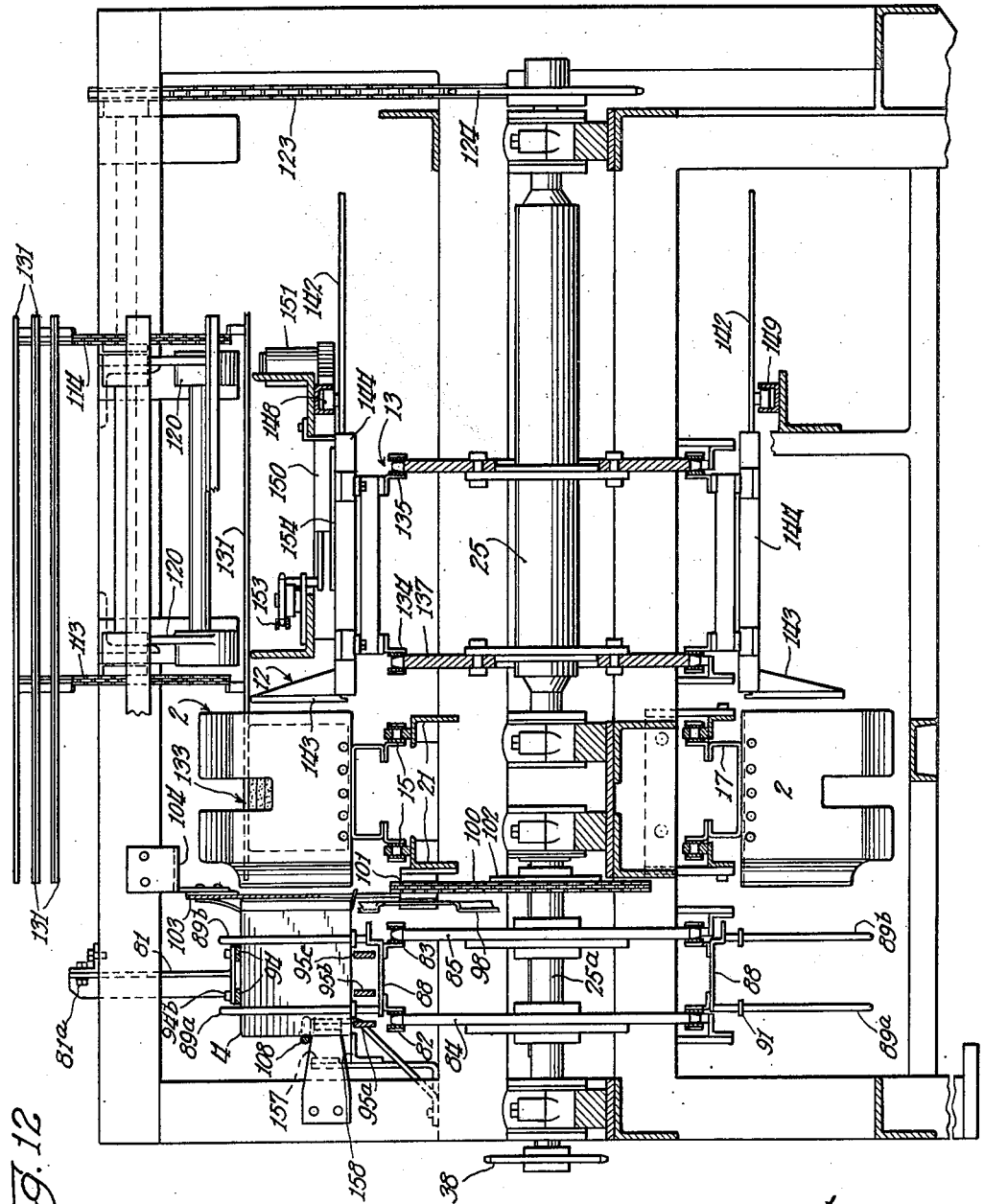

March 17, 1953 C. T. BANKS 2,631,767
PACKAGING MACHINE
Filed Feb. 21, 1948 13 Sheets-Sheet 11

Inventor:
Charles T. Banks
By: Lorans, Pond & Anderson
Attys

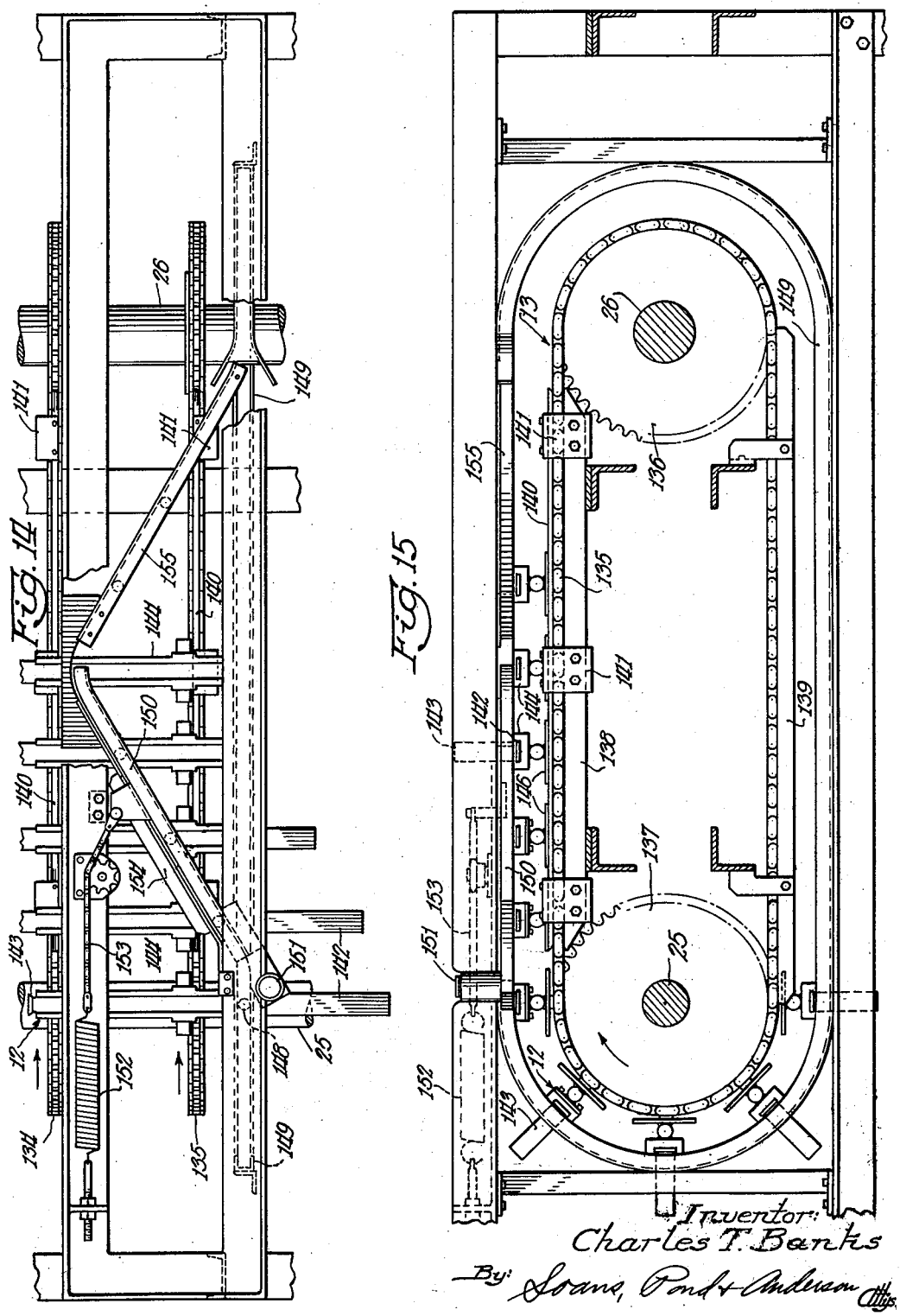

March 17, 1953 C. T. BANKS 2,631,767
PACKAGING MACHINE
Filed Feb. 21, 1948 13 Sheets—Sheet 13

Inventor:
Charles T. Banks
By: Soans, Pond & Anderson
Attys

Patented Mar. 17, 1953

2,631,767

UNITED STATES PATENT OFFICE 2,631,767

PACKAGING MACHINE

Charles T. Banks, Neenah, Wis., assignor to International Cellucotton Products Company, Chicago, Ill., a corporation of Delaware Application February 21, 1948, Serial No. 10,000

23 Claims. (Cl. 226—14)

This invention relates to apparatus for inserting articles into containers, and it is concerned more particularly with mechanism for inserting a stack of relatively soft, compressible articles into a carton.

The main objects of the invention are to provide mechanism for inserting a stack of articles into a container while maintaining the container and stack in constant motion, thereby to attain a high rate of package filling; to provide continuously operating mechanism of the character indicated, which will effectively insert stacks of soft, compressible articles (such as stacks of sanitary napkins, for example) into containers without soiling or otherwise impairing the goods notwithstanding their softness and lack of body strength; to provide such mechanism as will be operative to compress a stack of pads sufficiently to facilitate introduction of the stack into a container while maintaining the containers and stacks in motion as aforesaid; to provide means for receiving open ended containers in synchronized relation to the delivery of stacks of articles to the apparatus so as to insure the presence of a container for receiving each stack of articles delivered to the machine while also preventing the passage through the mechanism of an empty container and delivery of said empty container to package closing mechanism; and in general it is the object of the invention to provide packaging mechanism of the character indicated which is durable and efficient in continuous high speed operation.

Other objects and advantages of the invention will be understood by reference to the following specifications and accompanying drawings (13 sheets) in which there is illustrated for purposes of exemplifying the invention, a selected form of mechanism for packaging sanitary napkins in boxes.

In the drawings:

Figs. 1 and 2 are diagrammatic views respectively representing a side elevation and plan of the apparatus;

Fig. 3 is a side elevation corresponding to Fig. 1;

Fig. 4 is a perspective illustrating the type of box to be filled;

Figs. 5 and 6 are plan views which together represent a plan view of the machine, Fig. 5 showing the left-hand portion of Fig. 3, and Fig. 6 showing the right-hand portion of Fig. 3;

Figs. 7 and 8 are side elevations of the side opposite to that shown in Fig. 3, Fig. 7 illustrating the left-hand portion of Fig. 3, and Fig. 8 the right-hand portion of Fig. 3.

Fig. 9 is an enlarged view partially in elevation and partially in section on planes represented by the line 9—9 of Fig. 5;

Fig. 10 is a perspective illustrating the functioning of certain of the elements appearing also in Fig. 9;

Figure 13:
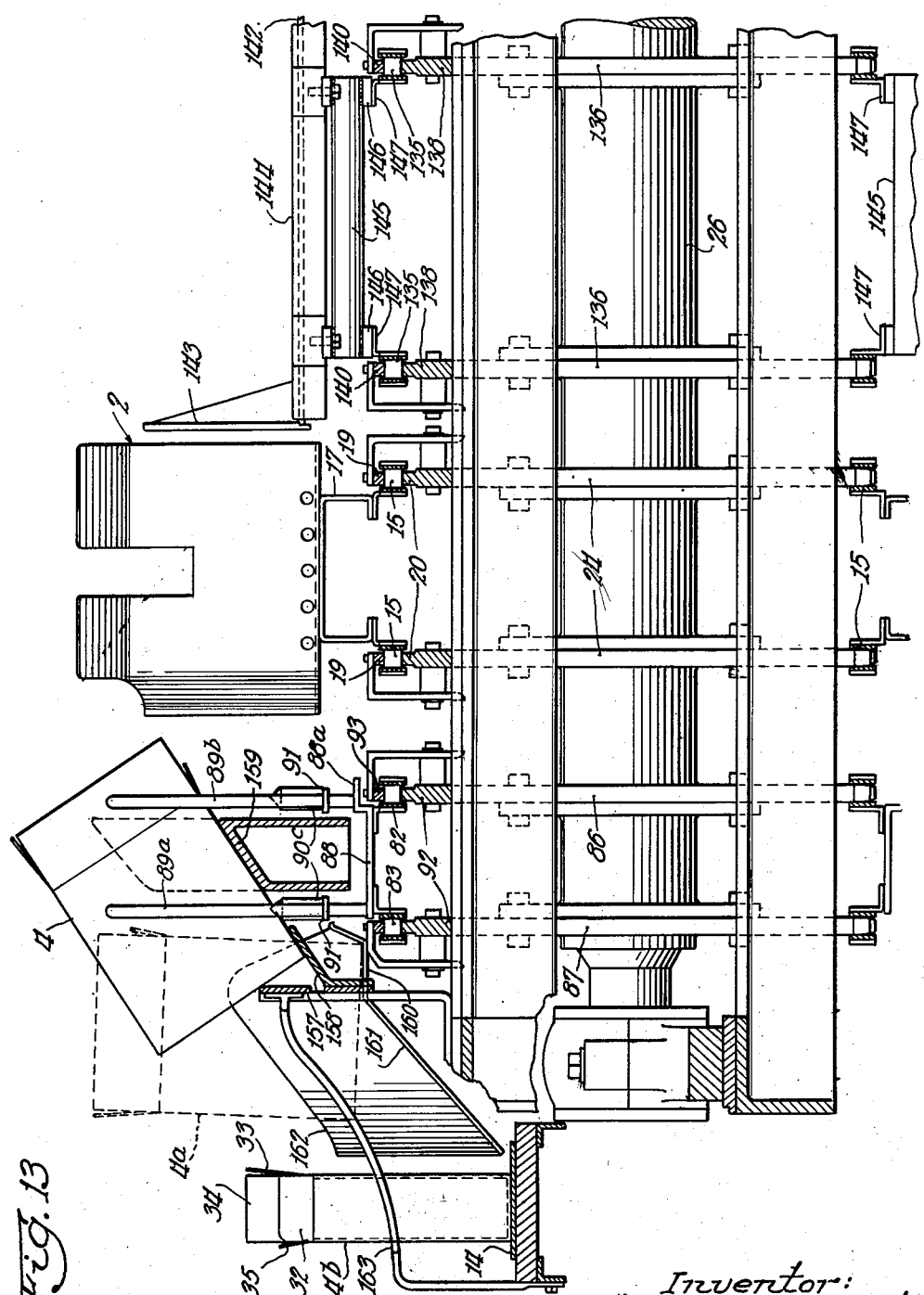
Figure 16:
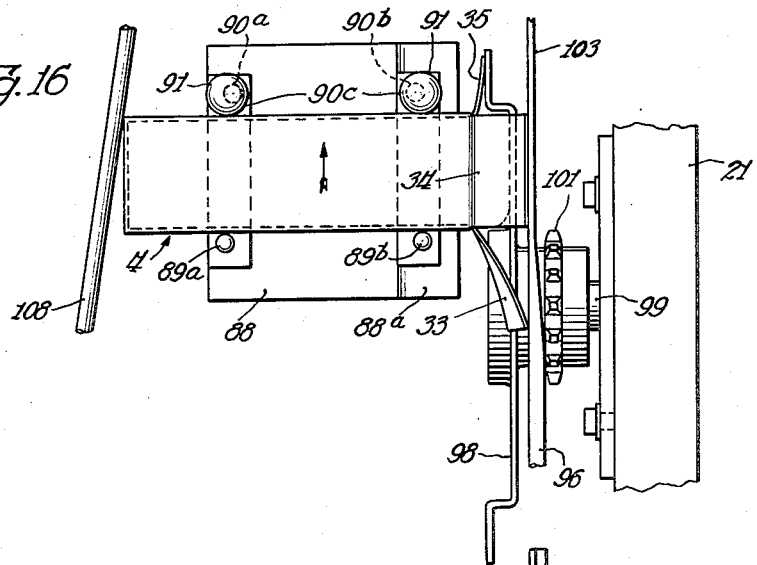
Figure 17:
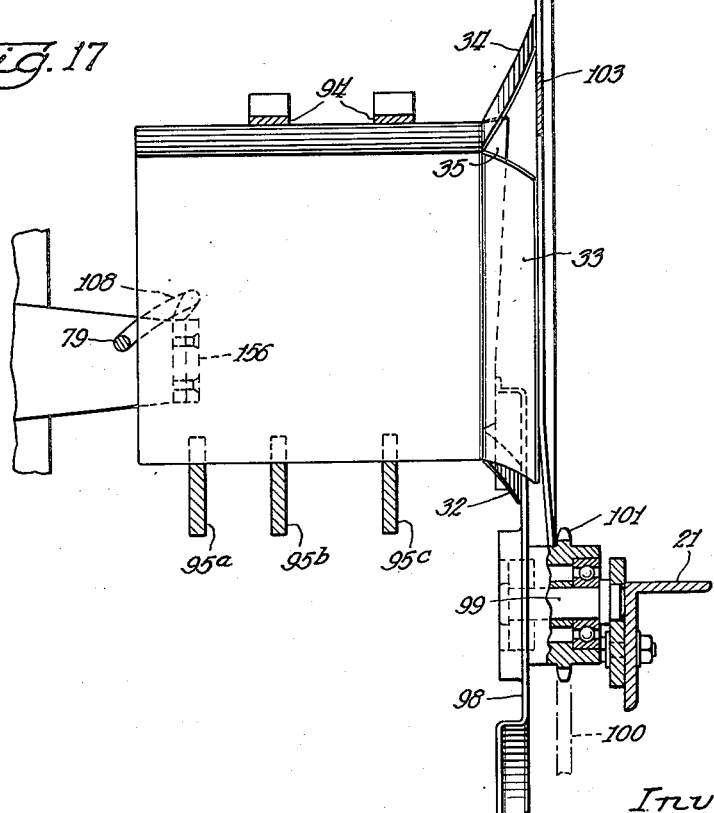

Figs. 11 and 12 are sections respectively on the lines 11—11 and 12—12 respectively on Figs. 3, 5 and 7;

Fig. 13 is a section on a plane represented by the lines 13—13 on Figs. 3 and 6;

Fig. 14 is a fragmentary plan view of a portion of the mechanism appearing in Fig. 5, certain overlying portions being omitted to clarify the illustration;

Fig. 15 is a side elevation of the mechanism illustrated in plan in Fig. 14; and Figs. 16 and 17 are plan and sectional views respectively as represented by the lines 16—16 and 17—17 on Fig. 9.

The general arrangement and functioning of the packaging mechanism about to be described may be understood by reference to the diagrammatic illustrations contained in Figs. 1 and 2. As there shown, a means is represented at 1 for successively depositing stacks of sanitary napkins into buckets or suitable receivers, represented at 2, these buckets or receivers being part of a continuously driven, endless conveyor 3. A series of boxes respectively represented at 4 are delivered in the same general direction as the buckets 2 travel, the boxes being guided by suitable conveyor 5 into a passageway between upper and lower conveyors 6 and 7 respectively, which are also continuously driven.

A detent 8 serves to stop the travel of the boxes, the conveyors 6 and 7 being of such character that they may continue to travel by sliding over the faces of the boxes when the latter are held against movement by said detent. The detent is disengaged automatically through the agency of a detector 9 each time that a bucket 2 filled with the required stack of napkins passes under the detector so that for each stack of napkins carried into the machine, a box 4 is delivered into the machine. The boxes are successively delivered to box carriers represented at 10, which are carried by a continuously driven, endless conveyor 11. The conveyors 3 and 11 are laterally offset, as shown in Fig. 2, and they are so supported that their upper reaches are disposed in approximately the same horizontal plane and they are driven at the same rate of travel so that the napkin supporting buckets 2 and box carriers 10 will travel in horizontal alignment so that the stacks of pads in the buckets 2 may be shipped endwise out of the buckets and into the boxes.

Transfer of the napkins from the buckets into boxes is effected by means of pushers 12, which are carried by a conveyor 13, the pushers being also horizontally aligned with the napkin buckets and box carriers and arranged for movement transversely through the buckets and back to normal position, as represented by the various positions of the pushers appearing in Fig. 2.

The filled boxes are discharged from the mechanism and delivered to a conveyor 14 or other desired receiving means preparatory to subsequent operations.

In Figs. 3, 5, 7 and 10, the conveyor 3 is shown as comprising a pair of chains 15, 15 and the buckets 2 are illustrated as consisting of U-shaped sheet metal receptacles provided with outwardly flared upper end portions 16 which cooperate to act like funnels for guiding stacks of pads into the parallel walled parts of the buckets. The stacks of napkins may be deposited in the buckets in any desired way and for present purposes it may be considered that the pads are dropped vertically downwardly into the buckets. These buckets are secured to the chains 15 through the agency of suitable formed sheet metal saddles 17, such as best shown in Figs. 9, 10 and 11. The buckets 2 are preferably formed of right and left L-shaped parts 2a and 2b, the horizontal bottom legs being horizontally adjustably secured to the saddles 17 by countersunk head screws which pass through holes or slots in the said bottom legs and threadedly engage appropriate tapped holes in the saddles. As shown in Fig. 9, the saddles may have two (or more) sets of tapped holes for the attaching screws of each bucket-forming member, as typified by the set 17b in which the attaching screws are seated in this instance, and the set 17c which is spaced from the set 17b for receiving the screws to position the bucket parts at a greater distance from each other.

Each saddle is attached to the chains 15 (see Figs. 9, 10 and 11) by means of ears 15a depending from about the middle of the length of the saddle. At the ends of the saddles, feet 17a are provided for engaging ears carried by the said chains, said ears being of the character of the ears to which the saddles are attached as shown in Fig. 11.

Each bucket 2 is provided with outwardly extending and converging side wall portions 18 which, as will hereinafter be seen, act to slightly compress and guide the articles ejected endwise from the buckets for delivery into the boxes.

In order that the buckets 2 be quite rigidly held in vertical position, the chains 15 which carry the buckets are closely guided by top and bottom guides 19 and 20 respectively, the said guides being suitably supported from quite sturdy portions of a siutable frame structure which, in this instance, is of angle iron construction, various parts of which are represented at 21. The side walls of the buckets 2 are provided near the bottoms of the buckets with holes, such as represented at 22, to facilitate the escape of air from the bottoms of the buckets when stacks of pads are dropped thereinto. By avoiding any tendency to trap air in the bottoms of the buckets, quick descent of the stacks of pads into the buckets is assured.

The conveyor chains 15 engage pairs of sprockets 23 and 24 at the opposite ends of the machine. The pair of sprockets 23 is mounted on a suitably journaled shaft 23a and the pair of sprockets 24 is secured to a suitably journaled and driven shaft 26 (see Figs. 3 and 13).

The shaft 26 is, of course, rotatably supported in bearings supported in the frame structure (see Figs. 6, 7 and 13) and it is driven from a suitable electric motor 27 (see Fig. 3) through the agency of suitable belt or chain drives, indicated at 28 and 29, these drives cooperating with suitable pulleys or sprockets. A variable speed drive unit 30 is interposed between the motor 27 and the drive sprocket 31 of the shaft 26 so that the speed at which the shaft 26 is rotated may be varied to suit operating requirements. However, it is practicable to design the machine to handle any specific quantity of articles per unit of time, the speed of the shaft and conveyors being made accordingly so that the variable speed unit is not essential.

In one practical embodiment, the speed of the conveyor chains 15, 15 and the sanitary napkin buckets thereon may be such that 140 buckets 7½ inches center to center pass a given point per minute. In other words, one practical embodiment of this apparatus is operative to fill boxes with sanitary napkins at the rate of 140 boxes per minute. As a practical matter this is considered a very high rate of speed, due regard being had for the difficulty of mechanically handling soft and compressible articles, such as sanitary napkins, without objectionably compressing the same.

The boxes 4 are formed in a suitable box setting up machine and as delivered to the machine have one end closed and the other end provided with end closure flaps which extend from the respective side walls of the box in continuations of the planes thereof. The boxes are in substantially the condition illustrated in Fig. 4 in which the box 4 is illustrated as having end closure flaps 32, 33, 34 and 35 extending endwise from the respective walls of the box. In this instance, the flap 33 is shown as having a length and width substantially corresponding to the dimensions of the open end of the box; the narrow side wall flap 34 a length corresponding to the length of the wide wall flap 33, and the other flaps 32 and 35 somewhat shorter lengths. The illustrated proportions of the closure flaps are not necessary and are shown merely to illustrate the ability of the apparatus to handle this type of box. Boxes with uniform or other irregular flap lengths may also be effectively handled by the apparatus.

As already indicated, the boxes 4 approach the machine in a flat-wise position on a suitable delivery conveyor 5. The open ends of the boxes are disposed adjacent the napkin bucket conveyor.

The conveyor 7 is here shown as being a multiple belt conveyor, in this instance comprising a belt 7A which is disposed under the end closure flap 33, an intermediate belt 7B and an outer belt 7C (see Figs. 5 and 11), these belts being guided by suitable pulleys 36 and 37 which are suitably journaled in brackets carried by the supporting frame of the machine.

The belts forming the conveyor 7 are driven from the shaft 25, which is provided at one end with a sprocket 38 for driving a chain 39, which is connected through a double sprocket 40 to a chain 41 which in turn engages a sprocket 42 on the journaled shaft 43 which carries the pulleys 36.

It is desirable to maintain the upper reaches of the belts 7A, 7B and 7C under accurately controlled tension so as to properly support and propel the boxes. For that purpose the lower reaches of the respective belts are supported intermediate the pulleys 36 and 37 by means of idler pulleys 73 which are each vertically adjustably supported by suitable brackets vertically slidably mounted on a cross plate 74 which is rigidly secured to portions of the machine frame. Screw adjusting means indicated at 75, acting between a frame supported angle 76 and the respective pulley brackets, is provided for facilitating accurate and closely controlled vertical adjustment of the pulleys 73.

The conveyor 6 comprises a pair of belts 6B and 6C which are respectively disposed in vertically aligned relation to the conveyor belts 7B and 7C as best shown in Fig. 11. These belts 6B and 6C are supported by a suitable double pulley 44 and by a pair of pulleys 45, which are supported for rotation in any suitable manner. In this instance, the pulleys 45 are journaled for rotation on a fixed shaft 46 and the pulley 44 is rotatable on a fixed shaft 47.

The shafts 46 and 47 are mounted on a cross head 48 which is secured to the upper end of a member 49 which is vertically adjustably mounted on the frame of the machine, as shown in Fig. 7. As there shown, said member 49 is vertically slidably mounted in side guides 50, 50 and adapted to be clamped in place by locking bolts 51 which pass through slots in the member 49 to permit vertical movement of the latter relative to said clamping bolts. A suitable adjusting screw arrangement 52 acts on the lower end of the member 49 and a frame supported bracket 53 to effect the required adjustment. This vertically adjustable arrangement for supporting the conveyor belts 6B and 6C permits adjustment of the spacing of the adjacent reaches of the conveyors 6 and 7 to permit the attainment of the desired slip driving effect of the conveyor belts on boxes of various thicknesses.

The upper conveyor belts 6B and 6C are driven by means of a chain drive 54 (Figs. 5 and 7). The chain 54 is driven by a sprocket on the driven conveyor shaft 43 and is guided over an idler sprocket 55, then under a sprocket 56 which is secured to the double pulley 44, and thence over another idler sprocket 57 and back to the drive sprocket on the shaft 43. The idler sprocket 57 is horizontally adjustable relative to the sprocket 56 to permit adjustment of the tautness of the chain 54. This adjustment also permits adjustment of the chain 54 as may be required incident to any vertical adjustment of the upper conveyor structure in the manner already described. The horizontally adjustable mounting of the sprocket 57 may be of any suitable form, a slot being here illustrated for horizontally adjustably receiving the shaft which rotatably supports the idler sprocket 57. A clamping nut may serve to lock the sprocket in any adjusted position.

The travel of the empty boxes between the conveyors 6 and 7 is controlled by the detent arm 8 (see Figs. 7, 9 and 11) which is secured to a rock shaft 58. The rock shaft 58 is suitably journaled in brackets carried by the frame structure. A spring 59 (see Fig. 3) stretched between a portion of the frame structure and an arm 60, which is also secured to said shaft 58 serves to normally rock said detent arm 8 downwardly to disengage the detent arm from the foremost box. However, the detent arm is normally locked in its operative position as shown in Fig. 9, by latch means which is controlled by the pads in the buckets of the conveyor 3 in such a manner that each time that a stack of pads enters the apparatus a box is also released to enter the apparatus for receiving such stack of pads.

The latch mechanism for controlling the box detent 8 comprises a plate 61, which is pivotally mounted at its upper end, as indicated at 62, on a horizontal cross arm 63 carried by an inverted U-shaped bracket 64 which extends upwardly from portions of the frame 21. As indicated in Fig. 9, the cross arm 63 is horizontally adjustably mounted on the bracket 64 so that the location of the plate 61 may be varied. The plate 61 constitutes a detector for determining the presence or absence of a stack of napkins in a bucket.

A latch pin 65 is rigidly connected to the hub element which also carries the detector finger 61 and said latch pin cooperates with an arm 66 which is pivoted on the cross member 63, as indicated at 67. The arm 66 is provided with a shoulder forming projection 68 which is adapted to engage the free end of the latch pin 65, the latter being disengageable from said shoulder 68 when the finger 61 is elevated by engagement therewith of the upper portion of a stack of pads in one of the conveyor buckets. The latch arm 66 is connected by means of a link 69 to an arm 70, which is rigidly secured to the detent shaft 58. A comparatively light spring 71 is stretched between a pin 72 which extends from the detector hub, and a conveniently accessible frame part to thereby normally urge the detector finger 61 downwardly and to resist its being displaced upwardly incident to any possible vibration in the machine. The weight of the detector finger 61 may otherwise be relied upon to return the detector finger and latch pin 65 to the locking position illustrated in Fig. 9.

For restoring the latch 8 from a disengaged position, there is provided a rotary cam 77 which is carried by a cross shaft 43, the said shaft being suitably journaled in the frame structure. Said cam is carried by the shaft 43 of the box conveyor 7 which shaft is chain driven from the shaft 25 so as to be maintained in predetermined synchronization with said shaft 25. The cam 77 acts against a roller carried by an extension 60A of the spring biased arm 60 and the cam is so set that it is operative to rock the detent 8 upwardly almost immediately after the leading end of the foremost box has moved past the hook end of the detent. The rear portion of such leading box may be moved upwardly slightly by return movement of the detent in order that the detent be returned to position in time to catch the next succeeding box. This is not objectionable and, in fact, is somewhat helpful in that the upward movement thereby imparted to the box is in keeping with the travel which is next imparted to the box.

As indicated in Figs. 9 and 11, the latch arm 8 embodies a forked end portion 8A which is adapted to engage the boxes at horizontally spaced points and said portion 8A is horizontally adjustably mounted on the arm part 8B which is secured to said rock shaft 58. The adjustability of the box engaging arm portion 8A lengthwise of the travel of the boxes permits adjustment of the rest position of the leading box whereby delivery of the leading box when released to the receiving conveyor may be effectively timed.

The boxes, during their passage between the conveyors 6 and 7, are guided at their closed ends by means of a guide rod 79 which is suitably secured to the frame structure. Their open ends are similarly guided by a guide plate 80, which is suitably secured to the framework.

The boxes 4 when released from between the conveyors 6 and 7 are successively delivered to the box carriers 10 on the conveyor 11. Said conveyor 11 comprises a pair of horizontally spaced chains 82 and 83 which are supported and propelled by means of sprockets 84 and 85 respectively on the shaft 25a (Fig. 12) which is substantially concentric with the shaft 25, and sprockets 86 and 87 on the shaft 26 (Fig. 13). Said shaft 26 is driven as already explained, so that the conveyor chains 82 and 83 are accordingly driven continuously. The sprockets 86 and 87 are of the same pitch diameter as the sprockets 20, 20 of the bucket conveyor so that said bucket conveyor and the box conveyor will be driven at the same rate of linear travel.

The box carriers 10 comprise base plates 88 which are secured by suitable angle link elements to the respective conveyor chains 82 and 83. Posts or pins 89A and 89B extend upwardly from the opposite margins of said base plate 88 near the rear or trailing end thereof. One side portion of each of said base plates 88 is offset upwardly, as indicated at 88A in order to clear an overlying guide for the chain 82 and the pin 89B extends from such upwardly offset base portion. Shorter front pins 90A and 90B spaced forwardly from the respective long rear pins 89A and 89B also extend upwardly from the base plate 88. The upper end portions of said forward pins 90A and 90B are equipped with heads 90C of enlarged diameter, such heads being eccentrically mounted on the respective pins 90A and 90B so as to permit adjustment of the effective space between the short front pins and the long rear pins. The leading and trailing pins at each side of the base plate are interconnected by means of straps such as indicated at 91, which constitute seats for receiving the boxes delivered between associated pairs of short and long pins.

The chains 82 and 83 are supported during their travel between the sprockets on the shafts 25 and 26 by means of underlying supporting straps 92 (Fig. 7) to which they are held against upward displacement by means of overlying guides 93. These guides are, of course, suitably mounted on the frame structure and the overlying guides are adjustable relative to the underlying supports so as to permit proper setting of the cooperating guides to prevent binding of the chains without at the same time permitting excessive swaying thereof either horizontally or vertically.

The apparatus is, of course, so timed that when a box 4 is released by the detent 8, a box carrier 10 will be approaching a position for picking up the released box 4. A portion of the conveyor 7 (see Fig. 9), which extends beyond the delivery end of the upper conveyor 6, carries each box forwardly into position against bottom guides 95a, 95b and 95c (see Figs. 9 and 12) and in position to be picked up by an approaching pair of long pins 89A and 89B as shown in position A in Figs. 5, 7 and 9. The leading short pins 90C will just begin to emerge upwardly from the top plane of the said guides 95 and will not interfere with delivery of the box as explained. In said position A the box 4 is not fully seated in the carrier 10 since the leading side of the box is spaced from the straps 91 of the receiving carrier. However, the box will be carried forwardly with the carrier by reason of the long pins 89A and 89B and the box will be moved downwardly in the carrier by means of overlying guide straps 94 which are disposed at a distance from the path of travel of the carriers, which gradually narrows until the spacing conforms to the dimension of the box whereby the box will, of course, be pushed down between the leading and trailing pins and seated on said straps 91.

During the travel of the boxes about the axis of the shaft 25a they are supported by underlying supporting straps 95A, 95B and 95C (Figs. 7, 9 and 17) which have their box engaging surfaces substantially parallel to the box guiding surfaces of the overlying guides 94. The path of the boxes during their movement about the axis of the shaft 25 will thus be seen to be eccentric with reference to the axis of said shaft.

The guides 94 are mounted so as to permit adjustment for handling boxes of other sizes. To that end, the receiving ends of the guides are horizontally adjustably mounted as shown at 94a (Fig. 7) on a bracket 21a which is vertically adjustably mounted on a frame post as shown at 94c (Fig. 11), and the delivery ends are similarly horizontally adjustably secured at 94b to a supporting bracket 81 which is vertically adjustably secured as shown at 81a on a frame part.

As the box 4 begins its upward travel about the shaft 25, its long flap 33 comes into engagement with a stationary folding rod 96 which is supported near its receiving end by means of a connection 97 to an adjacent frame part (see Figs. 5 and 11). Said folding rod 96 is so positioned that it will be operative to fold the long flap 33 rearwardly as an incident to the forward travel of the box. As the box progresses over its supporting straps 95, it comes into the zone of operation of a rotary folder, comprising diametrically opposed arms 98 mounted on a suitably journaled shaft 99. The shaft 99 and rotary folder 98 is driven by means of a chain 100 which engages sprockets 101 on the shaft 99 and a sprocket 102 on the shaft 25. The pitch diameters of the sprockets 101 and 102 are such that the folder arms 98 are synchronized with alternate box carriers as they progress from the above-mentioned station A.

A retarder 80a (Figs. 5, 7, 9 and 11) may be secured to the guide plate 80 in position to engage the end closure flap 33 as the upward movement of the box is initiated. This engagement of the flap 33 together with the frictional engagement of the guide 79 with the closed end of the box prevents the empty boxes from being kicked up and out of registry with the box carriers upon initial engagement of the boxes by the long pins 89.

As the box 4 progresses from the station A to a station B, represented in dotted lines in Fig. 9, one of the arms 98 of the rotary folder comes into position across the end of the short flap 32 but without initially engaging said flap. The extreme end portion of each of the arms 98 is offset toward the box, as is shown in Figs. 12 and 17, so that the offset end portion of the arm will necessarily engage the leading narrow flap 35c to initiate forward folding thereof while the box continues its forward travel. As the acting folder arm 98 continues its rotary movement, it also comes into engagement with the short flap 32 and folds said short flap downwardly. These folding operations of the rotary folder arm 98 are best shown in Fig. 10. Also, as represented in Fig. 10, as the box approaches the position C, its then uppermost end flap 34 engages the upper edge portion of the folding rod 96 which is so shaped as to enable said folding rod to initiate upward and outward folding of said flap 34 as is also shown in Fig. 10.

The folding rod 96 is continued and merged into a plate 103 which is fixedly mounted on accessible frame portions by means of brackets, such as indicated at 104 (Fig. 12) and at its lower end to a suitable support, such as indicated at 105. The plate 103 has its upper end portions 106 formed in continuation of the folding rod 96 to continue the outward unfolding of the flap 34 and the front portion of the plate is widened from a relatively narrow tapered nose part 107 to its maximum width, as shown in Figs. 9 and 10, in such a manner that as the box progresses its opened flaps will engage the adjacent face of the plate 103 to be thereby held open, as best indicated in station D of Fig. 10.

The flap opening movement is further assisted by means of the guide rod 79 which, as will be seen from an inspection of Figs. 5, 7 and 9, is continued upwardly in an arc about the shaft 25 and is also angularly directed toward the plate 103, as shown at 108 (Figs. 5 and 11). This guide rod portion 108 serves to move the boxes endwise so as to position the open end flaps, when opened to right angular relation to the walls from which they extend, against the plate 103.

The plate 103 has an extension 109 from its upper margin, which is provided for continuing to hold the upper flap 34 in its full open position while the remaining flaps are permitted to return toward their closed positions until they come into engagement with the converging side wall portions 18 of the buckets 2 and with the adjacent end portions of the bottom walls of the buckets, as shown in the station represented at E in Fig. 10. To this end, the plate portion which holds the flaps 32, 33 and 35 open is terminated, as shown at 110 and 111 (Fig. 10), the arrangement being such that the bottom flap 32 is held open somewhat longer than the side flaps 33 and 35. This, however, is not of critical importance inasmuch as by the time the boxes have reached the station D, buckets 2 are aligned therewith so that as soon as the flaps 32, 33 and 35 are released they may assume the position shown at station E in Fig. 10.

During these flap opening operations on the box, the box is held down in the box carriers by means of extensions 94a of the top guides 94, which have also cammed the boxes to their fully seated position on the supporting straps 91 of the box carriers.

When a box is brought to the position represented at station E in Fig. 10, it is ready to have a stack of articles 112 moved endwise from the bucket 2 into the box. This is accomplished during continuation of the travel of the boxes and buckets, it being remembered that the boxes and buckets travel at the same rate of speed so that during what is in effect unitary travel of the buckets and boxes, the articles may be transferred without stopping such travel. This is accomplished by means of the pushers 12. However, in the packaging of certain articles, such as sanitary napkins, the articles in a loose stack as in the buckets, have a height or depth which is greater than the corresponding vertical dimension of the box associated with the bucket. Therefore, it is necessary to first compress the stack to a dimension which will permit the stack to be moved in its entirety or as a unit into the box.

One form of compressing mechanism, which is suitable for the purpose, is shown in Figs. 7 and 12 (also Figs. 1, 3 and 5). Such compressing mechanism comprises a pair of endless chains 113 and 114, which engage and are guided by suitable sprockets, such as represented at 115, 116, 117, 118 and 119 (Fig. 7). These sprockets are suitably mounted for rotation by means of frame supported brackets 120, 121 and 122. These chains are driven in accurate synchronization with the travel of the buckets 2 and boxes 4 by means of a driving chain 123 which is driven by a sprocket 124 on the driven shaft 125, idler sprockets 126 and 127 and a sprocket 128 mounted on the shaft which carries the chain sprockets 118. The idler 127 is mounted on a plate 129 which is pivotally secured at one end to a frame part and adjustably secured at its other end to another frame part. Similarly the idler sprocket 126 is mounted on a plate 130 which is horizontally adjustably mounted on parts of the frame structure. Adjustability of the sprockets 126 and 127 permits adjustment of the tightness of the driving chain 123 and also adjustment of the position of any given point on the chains 113 and 114 relative to the buckets 2 of the article conveyor.

The chains 113 and 114 are, of course, driven at the same rate of travel as the buckets 2 and they support a plurality of compression bars 131 which are spaced from each other the same center to center distance as the buckets 2.

The arrangement of the sprockets 115 and 116 is such that each compression bar 131 is caused to gradually approach and enter a bucket to thereby compress the articles in the bucket from their normal depth, as represented at 132 in Fig. 7, to a reduced depth 133, as shown in Fig. 12, which is preferably slightly less than the corresponding dimension of the box into which the articles are to be inserted. The compression bars 131 extend over substantially the entire length of the respective buckets, as is shown in Fig. 12, so that when the associated pusher 12 acts against the stack of articles, said stack will be held under the desired compression throughout most of its crosswise travel into the box.

As shown in the drawings, the compression conveyor comprising the chains 113, 114 and the compressor bars 131 are offset laterally with reference to the article conveyor. This arrangement is highly desirable in that it avoids a considerable danger of foreign matter dropping from the compressor conveyor on to the articles in the article holders on the article conveyor. Hence, cleanliness of the articles is protected. The compressor bar extensions which necessarily overlie the article holders may be of simple, smooth surfaced, flat bar structure which offers but little danger of dropping foreign matter into the article holders, and in any event such plain end extensions may be easily and expeditiously cleaned from time to time as may be required.

The compressor conveyor may be adjusted vertically by adjusting the brackets 120 and 122 up or down on their supporting frame to which they may be attached by bolts passing through vertical slots in the said brackets. However, vertical adjustment may, in effect, be obtained by the simple expedient of suitably modifying the height of the ears or legs which connect the compressor bars to the chains 113 and 114 (see Fig. 12).

There are a plurality of pushers 12 arranged in the same center to center spacing as the article carrying buckets and these pushers 12 are carried by the conveyor 13 which comprises endless conveyor chains 134 and 135. These chains are supported by sprockets 136, 136 on the shaft 26 and by sprockets 137 on the shaft 25 (see Figs. 12, 13 and 15). The chains are, of course, driven at the same rate of travel as the bucket conveyor and box conveyor incident to the cam drive or all of these conveyors emanating from the shaft 26 and the employment of driving sprockets of the same pitch diameter for each of these conveyors. The upper and lower reaches of the chains 134 and 135 intermediate the sprockets 136 and 137 are supported by means of underlying guide bars 138 and 139 respectively, which are supported by frame parts as indicated in Fig. 15. The upper reach of the chains 134 and 135 are also guided by overlying guide members 140 (Figs. 13 and 15) which are suitably supported from the underlying supporting bars 138 as by means of brackets, such as represented at 141.

The pusher bars 12 each comprise a horizontal slide bar 142 and a vertical upstanding head 143. The slide bars 142 are horizontally slidably mounted in suitable guide boxes 144, which are in turn mounted on the conveyor chains 134 and 135. In this instance, the slide boxes 144 are mounted on the chains through the agency of rods, such as indicated at 145, which are welded or otherwise secured to the under sides of the boxes and which have cross bars 146, 146 welded to the under sides of their opposite end portions. These cross bars 146 have their central portions under the respective guide boxes welded or otherwise secured to ears, such as indicated at 147, which extend laterally from the respective conveyor chains 134 and 135. The free end portions of said cross bars 146, which extend symmetrically forwardly and rearwardly from the respective guide boxes, are adapted to engage other conveyor chain ears 147 to thereby support the bars 146 and the guide boxes 144 against rocking movement. The ends of the cross bars 146 are, of course, not secured to such other ears but are free to leave them during the travel of the guide boxes around the sprockets 136 and 137, as indicated in Fig. 15.

The slide bars 142 are each equipped with an upstanding roller 148 which normally travels in a channel guideway 149 whereby the pusher is held in its normally retracted position, as shown in Fig. 12. During the travel of the pushers over the upper reach of the conveyor 13, said rollers 148 are arranged to engage an angularly disposed cam track section 150 which is pivoted at one end as indicated at 151 on a frame part and normally but yieldingly held in predetermined angular position by means of a spring 152 which has one end anchored to the frame structure and its other end connected by a suitably guided chain length 153 to a portion of the cam track 150. The spring 152 is a quite stout spring so when the pusher rollers 148 come into engagement with the angularly disposed cam track portion 150 the pushers will be caused to slide forwardly in their respective slide boxes, thereby to cause the pusher heads 143 to pass through the buckets and feed the articles therein into the associated box 4. The operative position of the angular track part 150 may be determined in any suitable manner, for example, by means of a fixedly mounted stop member 154 which is secured to portions of the frame structure.

In the event that normal feeding of the articles from a bucket into a box is obstructed, the angularly disposed track portion 150 may yield so as to avoid forcing the pusher to advance against the obstruction, possible damage and other difficulties being thereby avoided.

Retraction of the plungers from their advanced position is similarly effected by means of a fixed angularly disposed track portion 155 which is suitably mounted and arranged to return the roller 148 to the receiving end of the track channel 149 as best shown in Fig. 14. It will be seen that each pusher is normally caused to gradually advance and eject a stack of articles from its associated bucket and to insert such articles into an associated box, whereupon each pusher is retracted and returned to its normal inoperative position. This pusher movement is effected while the pusher continues to travel as a part of the conveyor chains 134 and 135 comprising the conveyor 13.

The throw of the pushers is considerably more than that required for merely feeding the articles from the buckets into the boxes. As shown in Fig. 5, the pusher head 143 in the station marked J has advanced sufficiently to press the stack of articles approximately half way into the box 4, the box being up to that time and for a short time past the station J held against movement with the pusher by means of an extension portion 156 of the end guides 79 and 108. At about the time that the articles are fully inserted in the box, the box is carried beyond the end of said guide extension 156 and is thereupon permitted to move in unison with the advancing crosswise travel of the plunger head 143 to the position indicated in the station marked K. The endwise movement so imparted to the packages is limited by means of a stop or guide bar 157 suitably supported by the frame structure.

At said station or position K, the pusher head 143 is approaching its limit of outward movement but the angularly disposed track portion 148 has not yet been completely traversed and will effect sufficient additional movement of the plunger head to complete the insertion of the articles into the box and somewhat more to slightly compress the articles in the box. Projection of articles beyond the fold lines of the end closure flaps 32 to 35 inclusive is thereby avoided.

The endwise shifting of the box together with its content between the positions represented in stations J and K of Fig. 5, is not necessary but it is desirable as a convenient manner of positioning the package for discharge from the box conveyor. As shown in station K, the closed end portion of the box projects substantially beyond the adjacent side of the box conveyor and the box flaps 32, 33, 34 and 35 have been completely disengaged from the mouth of the bucket 2. In position K, upending of the open end of the box for discharge purpose is facilitated.

As already explained, the filled box is discharged to a conveyor 14 and in this instance, this is accomplished by up-ending the box and causing it to ride off an auxiliary shelf-like member 158, which is fixedly positioned and secured to the frame structure.

By reference to Figs. 6 and 8, it will be seen that there is provided a slide or shoe 159 which is disposed at an upwardly inclined angle from its lower or receiving end 159a, which end portion begins in a plane below the level of the box supporting straps 91 of the box carriers.

The elevating shoe 159 is located intermediate the paths of travel of the pins 89a and 89b and 90c as shown in Fig. 6 so that as the box carriers progress, the bottom side of the box is brought into engagement with the upwardly inclined surface of the slide 159. Because of the previous endwise shifting of the box, said slide 159 engages the box near its open end so that the box will not be balanced on said slide but will tend to rock about said slide as the height thereof increases to further produce such up-ending action on the box. The surface of the slide 159 is gradually turned from a horizontal plane at its receiving end to an angle as indicated in Fig. 13 at its discharge end. Acccordingly as the box advances, it is turned about an axis adjacent its closed end which at that time rides against the stop 157 and on the shelf 158 as shown in Fig. 13.

The elements which effect up-ending of the box incident to its travel with the carriers are so formed that the box is ultimately turned to an almost vertical position, as represented in dotted lines at 42 in Fig. 13. By that time the box has been propelled beyond the end 157a of the guide 157 and the adjacent end of the shelf 158 so that the box is permitted to drop down to a second shelf 160 which is relatively narrow and supports only a small portion of the width of the box. The box is unbalanced on such second shelf 160 and continues its tipping or rocking motion and slides down a chute 161 and is deposited on the discharge conveyor 14, as indicated at 4b in Fig. 13. A suitable stop or guide wall 162 is provided and a guide rod 163 is also provided to cooperate with said guide or stop 162 for turning the boxes to a substantially facewise parallel relationship to the side edges of the conveyor belt 14.

The conveyor belt 14 may conduct the filled-up, open ended boxes into the zone of operation of other equipment which may deposit instruction sheets, advertising matter or other inserts in the open end of the box and thence, or directly, to mechanism for closing and sealing the end flaps 32 to 35 inclusive.

The described mechanism is a continuously operating mechanism and is capable of operation at very high rates of speed. The bucket conveyor which receives the stacks of articles to be delivered into the boxes may be a very long conveyor arranged to receive stacks of articles directly from a battery of machines, each of which produces and stacks the articles and periodically delivers the stacks to the buckets on the conveyor. With such an arrangement manual handling of the articles may be completely avoided while at the same time maintaining at a minimum even the mechanical handling to which the articles are subject. This is highly advantageous in connection with the packaging of sanitary specialties, such as sanitary napkins. Similarly the delivering of the stacks of napkins into boxes without manual handling as effected by the described apparatus is highly advantageous not merely because of the economy of high speed mechanical operation, but also because of the hygienic aspects thereof.

Various changes may be made in the structure while retaining the principles of the structure as described and referred to in the following claims.

I claim:

1. Apparatus for inserting articles into boxes, comprising a box conveyor, an article conveyor, said conveyors being disposed side by side in transversely spaced relation, means for driving said conveyors at like rates of travel, box supporting means and article carriers on said conveyors for supporting boxes and articles in predetermined position of alignment for facilitating shipment of the articles from the article conveyor into boxes on the box conveyor, means for effecting such shipment of the articles during the travel of the conveyors, means for delivering boxes to said box conveyor, said boxes having at one end, end closure flaps extending from the respective walls of the box, means associated with said box conveyor for opening said flaps to laterally outwardly extending position relative to the respective walls from which the flaps extend, and means effecting endwise shifting of the boxes to move the same toward the article carriers so as to position the open ends of the boxes in such proximity to the adjacent ends of the article carriers that said end closure flaps are capable of bridging the space between the box ends and said article carriers, said flap opening means being such as to permit certain of said flaps to return from opened position toward initial position so as to thereby bridge said space and constitute, in effect, funnels for guiding articles from said article carriers into said boxes.

2. Apparatus for inserting articles into boxes, comprising a box conveyor, an article conveyor, means for driving said conveyors at like rates of travel, means on said conveyors for supporting boxes and articles in predetermined position of alignment for facilitating shipment of the articles from the article conveyor into boxes on the box conveyor, means for effecting such shipment of the articles during the travel of the conveyors, and means for delivering empty boxes to said box conveyor, said box delivering means comprising a pair of cooperating conveyors arranged to propel said boxes along a predetermined substantially fixed path of travel between said conveyors, one of said cooperating conveyors being mounted for adjustment as a unit toward and from the other to obtain such engagement with the boxes that the boxes will normally be propelled but also permitting slipping of said conveyors relative to said boxes in the event of interference with the passage of said boxes between said conveyors, a box holder associated with said pair of cooperating conveyors for stopping the advance of boxes between said cooperating conveyors, a detector connected to said box holding means, disposed in the path of travel of articles carried by said article conveyors, and operative incident to engagement of the detector with one of said articles to effect disengagement of said box holding means, and means for automatically restoring said holding means to operative position.

3. Apparatus for inserting articles into boxes, comprising a box conveyor, an article conveyor, means for driving said conveyors at like rates of travel, means on said conveyors for supporting boxes and articles in predetermined position of alignment for facilitating shipment of the articles from the article conveyor into boxes on the box conveyor, means for effecting such shipment of the articles during the travel of the conveyors, said box supporting means comprising a pair of pins adapted to receive a box therebetween to thereby position the same, one of said pins being mounted for adjustment relative to the other to thereby facilitate adjustment of said box supporting means for handling boxes of various sizes.

4. Apparatus for inserting articles into boxes, comprising a box conveyor, an article conveyor, means for driving said conveyors at like rates of travel, means on said conveyors for supporting boxes and articles in predetermined position of alignment for facilitating shipment of the articles from the article conveyor into boxes on the box conveyor, means for effecting such shipment of the articles during the travel of the conveyors, said box supporting means comprising cradles having bottom members, back members and front members, the front members comprising eccentrically mounted members which are adjustable toward and from the back members incident to rotary movement of said front members about their eccentric axes.

5. Apparatus for inserting articles into boxes, comprising a box conveyor, an article conveyor, means for driving said conveyors at like rates of travel, means on said conveyors for supporting boxes and articles in predetermined position of alignment for facilitating shipment of the articles from the article conveyor into boxes on the box conveyor, means for effecting such shipment of the articles during the travel of the conveyors, the boxes being each provided with one closed end and end closure flaps extending endwise from the walls of the box at the opposite ends thereof, means associated with said box conveyor for folding said end flaps to open to laterally outwardly extending positions relative to the walls from which they extend, said flap opening means comprising normally fixed elements operative to unfold certain of said flaps as aforesaid as an incident to travel of the boxes on the conveyor, and a rotary member operative to engage the flap which projects from the leading wall to thereby open the same to said laterally extending position during the travel of the box on the conveyor, and relatively fixed means engageable by said opened leading wall flap for holding the same in said open position during travel of the box on said box conveyor.

6. Apparatus, according to claim 5, wherein the rotary flap opening means also operates to engage the flap extending from the lowermost wall of the box to fold the same laterally downwardly from said lowermost wall, said leading wall flap holding means being also operative to hold said lower wall flap in open position.

7. Apparatus, according to claim 5, wherein the rotary flap opening means also operates to engage the flap extending from the lowermost wall of the box to fold the same laterally downwardly from said lowermost wall, said leading wall flap holding means being also operative to hold said lower wall flap in open position, and normally stationary means for engaging the closed ends of said boxes and advancing the boxes endwise to effect part of the unfolding of said flaps to said laterally extending open position.

8. In apparatus of the class described, a box conveyor, an article conveyor, an article compressor conveyor and an article pusher conveyor, said compressor conveyor being disposed in overlying relation to said pusher conveyor and said box, article and pusher conveyors being disposed in laterally separated relationship to each other, and said compressor conveyor being disposed in laterally offset relation to said article conveyor, box holders, article holders, compressor bars and pushers mounted respectively on said conveyors in like spaced relation so as to facilitate simultaneous transverse alignment of a plurality of box holders, article holders, compressors and pushers on said conveyors, said conveyors being driven at like rates of speed so as to maintain said transverse alignment of the box holders, article holders, compressors and pushers during the travel thereof with their respective conveyors, said compressors extending laterally from the compressor conveyor into overlying relation to the article holders and being operative to compress articles in said holders while the same are maintained in continuous movement, said pushers being mounted on said pusher conveyor for sliding movement transversely of the direction of travel of said conveyor, and stationary cam means acting on said pushers to effect movement thereof transversely of said pusher conveyor to thereby cause said pushers to eject the articles from said article holders and to insert said articles into boxes carried by said box conveyor.

9. Apparatus, according to claim 8, wherein the pushers are moved transversely a distance in excess of that required for shipping the articles from the article conveyor into boxes on the box conveyor, and wherein there is a stop for supporting the boxes against movement incident to the delivery of articles into the boxes, said stop being terminated so as to permit the boxes and articles therein to be shifted transversely of the box conveyor during a terminal portion of the operative movement of said pushers to thereby position the filled boxes for discharge from the box conveyor.

10. Apparatus for inserting stacks of articles into boxes, comprising a box conveyor, an article conveyor, means for driving said conveyors at like rates of travel, means on said conveyors for supporting boxes and stacks of articles in predetermined position of alignment for facilitating shipment of the stacks of articles from the article conveyor into boxes on the box conveyor, means for effecting such shipment of the articles during the travel of the conveyors, said article supporting means comprising a base having side wall members extending upwardly therefrom to form a receptacle, a bracket connecting a central part of said receptacle and said article conveyor, and feet depending rigidly from said receptacle on opposite sides of said bracket for engaging portions of said conveyor spaced from said bracket to thereby prevent rocking of said receptacle on said bracket as a fulcrum.

11. Apparatus for inserting stacks of articles into boxes, comprising a box conveyor, an article conveyor, means for driving said conveyors at like rates of travel, means on said conveyors for supporting boxes and stacks of articles in predetermined position of alignment for facilitating shipment of the stacks of articles from the article conveyor into boxes on the box conveyor, means for effecting such shipment of the articles during the travel of the conveyors, said article supporting means comprising a saddle, a pair of side wall members mounted on said saddle for movement toward and from each other to adjust the space therebetween, a bracket interconnecting a central portion of said saddle and said article conveyor, and feet depending from said saddle on opposite sides of said bracket and in spaced relation thereto for engaging spaced portions of said conveyor to prevent rocking of said saddle and wall members about said bracket as a fulcrum, said feet being separable from said conveyor so as to facilitate movement of said conveyor carried saddle through an arcuate path of travel.

12. Apparatus for inserting articles into boxes, comprising a box conveyor, an article conveyor, means for driving said conveyors at like rates of travel, means on said conveyors for supporting boxes and articles in predetermined position of alignment for facilitating shipment of the articles from the article conveyor into boxes on the box conveyor, means for effecting such shipment of the articles during the travel of the conveyors, and means for delivering empty boxes to said box conveyor, said box delivering means comprising a pair of cooperating conveyors arranged to propel said boxes along a predetermined substantially fixed path of travel between said conveyors, one of said cooperating conveyors being mounted for adjustment as a unit toward and from the other to facilitate the feeding by said pair of conveyors, of boxes of various thicknesses.

13. Apparatus for inserting articles into boxes, comprising a box conveyor, an article conveyor, means for driving said conveyors at like rates of travel, means on said conveyors for supporting boxes and articles in predetermined position of alignment for facilitating shipment of the articles from the article conveyor into boxes on the box conveyor, means for effecting such shipment of the articles during the travel of the conveyors, and means for delivering empty boxes to said box conveyor, said box delivering means comprising a pair of cooperating conveyors arranged to propel said boxes along a predetermined substantially fixed path of travel between said conveyors, one of said cooperating conveyors being mounted for adjustment as a unit toward and from the other to facilitate the feeding of boxes of various thicknesses by said conveyors, upper and lower guides associated with said first mentioned box conveyor, one of said guides being mounted for adjustment toward and from the other so as to permit setting of said guides at various distances from each other for guiding boxes of various heights.

14. Apparatus for inserting articles into boxes, comprising a box conveyor, an article conveyor, means for driving said conveyors at like rates of travel, means on said conveyors for supporting boxes and articles in predetermined position of alignment for facilitating shipment of the articles from the article conveyor into boxes on the box conveyor, means for effecting such shipment of the articles during the travel of the conveyors, and means for delivering empty boxes to said box conveyor, said box delivering means comprising a pair of cooperating conveyors arranged to propel said boxes along a predetermined substantially fixed path of travel between said conveyors, one of said cooperating conveyors being mounted for adjustment as a unit toward and from the other to facilitate the feeding of boxes of various thicknesses by said conveyors, upper and lower guides associated with said first-mentioned box conveyor, one of said guides being mounted for adjustment toward and from the other so as to permit setting of said guides at various distances from each other for guiding boxes of various heights, box holding means for restricting the movement of boxes from said box delivering conveyors to said first-mentioned box conveyor, and means actuated by an article carried by said article conveyor and connected to said holding means to effect release of a box for delivery to said first-mentioned box conveyor.

15. Apparatus, according to claim 10, wherein the article inserting means comprises a pusher for moving the articles from said article conveyor into a box on said box conveyor, there being a supporting member for holding said boxes against endwise shifting incident to the introduction of the articles into the boxes, said box supporting means being terminated and said pusher having a throw of sufficient length to force the filled boxes to move endwise to an offset position on the conveyor as an incident to a terminal portion of the operative movement of the pusher, thereby to initiate displacement of the filled boxes from the conveyor.

16. Apparatus for inserting articles into boxes, comprising a box conveyor, an article conveyor, means for driving said conveyors at like rates of travel, means on said conveyors for supporting boxes and articles in predetermined position of alignment for facilitating shipment of the articles from the article conveyor into boxes on the box conveyor, means for effecting such shipment of the articles during the travel of the conveyors, and means for delivering empty boxes to said box conveyor, said box delivering means being normally operative to feed boxes to said box conveyor but also operative to permit the boxes to remain stationary against the feeding effect of said box delivering means in the event of application to said boxes of a feed-movement-resisting force, a box holder associated with said box delivering means for stopping the feed of boxes by said means, a detector disposed adjacent the path of travel of said article conveyor and engageable with articles conveyed by said article conveyor, and means connecting said detector to said box holder so as to cause the latter to release a box for delivery to said box conveyor as an incident to engagement of an article by said detector.

17. Apparatus for inserting articles into boxes comprising a box conveyor, an article conveyor, means for driving said conveyors at like rates of travel, means on said conveyors for supporting boxes and articles in predetermined position of alignment for facilitating shipment of the articles from the article conveyor into boxes on the box conveyor, means associated with said article conveyor for effecting compression of the articles carried thereby and maintaining such articles compressed during the travel of the articles on said article conveyor, said article compressing means comprising a compressing conveyor disposed in laterally offset relation to said article conveyor, slats on said compressing conveyor extending laterally into overlying relation to said article conveyor and being operative to engage and compress articles carried by said article conveyor, and means operative while the articles continue their travel on said article conveyor and while the articles are held under compression by said compressing conveyor, to effect shipment of the articles from said article conveyor into boxes on said box conveyor.

18. Apparatus for inserting articles into boxes comprising a box conveyor, an article conveyor, means for driving said conveyors at like rates of travel, means on said conveyors for supporting boxes and articles in predetermined position of alignment for facilitating shipment of the articles from the article conveyor into boxes on the box conveyor, means associated with said article conveyor for effecting compression of the articles carried thereby and maintaining such articles compressed during the travel of the articles on said article conveyor, said article compressing means comprising a compressing conveyor which is driven at the same rate of travel as said box and article conveyors, article compressing slats on said compressing conveyor and engageable with articles carried by said article conveyor, and means operative while the articles continue their travel on said article conveyor and while the articles are held under compression by said compressing conveyor, to effect shipment of the articles from said article conveyor into boxes on said box conveyor.

19. In apparatus of the class described, a box conveyor, an article conveyor, an article compressor conveyor and an article pusher conveyor, said compressor conveyor being disposed in overlying relation to said pusher conveyor and said box, article and pusher conveyors being disposed in laterally separated relationship to each other, box holders, article holders, compressor bars and pushers mounted respectively on said conveyors in like spaced relation so as to facilitate simultaneous transverse alignment of a plurality of box holders, article holders, compressors and pushers on said conveyors, said conveyors being driven at like rates of speed so as to maintain said transverse alignment of the box holders, article holders, compressors and pushers during the travel thereof with their respective conveyors, said compressors being operative to compress articles in said holders while the same are maintained in continuous movement, said pushers being mounted on said pusher conveyor for sliding movement transversely of the direction of travel of said conveyor, and cam means acting on said pushers to effect movement thereof transversely of said pusher conveyor to thereby cause said pushers to eject the articles from said article holders and to insert said articles into boxes carried by said box conveyor.

20. Apparatus for inserting articles into boxes, comprising a box conveyor, an article conveyor, means for driving said conveyors at like rates of travel, means on said conveyors for supporting boxes and articles in predetermined position of alignment for facilitating shipment of the articles from the article conveyor into boxes on the box conveyor, means associated with said article conveyor for effecting compression of the articles thereon and maintaining the same compressed during the travel of the articles on said article conveyor, and means operative while the articles continue their travel on said article conveyor and while the articles are held under compression as aforesaid, to effect shipment of the articles from said article conveyor into aligned boxes on said box conveyor, said article shipping means comprising a pusher simultaneously movable transversely of and in the direction of travel of said conveyors, and movable in said transverse direction a distance in excess of that required for shipping the articles from said article conveyor into boxes on said box conveyor, stop means for holding the boxes against movement in said transverse direction incident to the delivery of articles into said boxes, said stop means being terminated so as to permit the boxes and articles therein to be shifted transversely of the box conveyor by said pusher during a terminal portion of the operative movement thereof to thereby adjust the position of the filled boxes relative to said box conveyor.

21. Apparatus for inserting articles into boxes, comprising a box conveyor, an article conveyor, said conveyors being disposed in transversely spaced relationship to each other, means for driving said conveyors at like rates of travel, means on said conveyors for supporting boxes having open filling ends and articles respectively in predetermined position of alignment for facilitating shipment of the articles from the article conveyor into boxes on the box conveyor, means for effecting such shipment of the articles during the travel of the conveyors, said box supporting means extending upwardly from said box conveyor and being open so as to permit upward and lateral displacement of the boxes from said box conveyor, relatively stationary means having an upwardly inclined surface portion disposed under the path of travel of the open end portions of the filled boxes on said box conveyor and operative as an incident to the travel of the boxes on said conveyor, to upwardly and laterally displace the filled boxes from said box conveyor, and to up-end said filled boxes, and means for receiving and guiding said filled boxes from the apparatus.

22. Apparatus for inserting stacks of articles into boxes, comprising a pair of conveyors arranged side by side for travel along substantially parallel paths, means simultaneously driving said conveyors at like rates of travel in the same direction, box holders on one of said conveyors, article holders on the other of said conveyors, said box holders and said article holders being mounted on the respective conveyors so that said article holders are respectively in alignment with said box holders transversely of the travel of said conveyor, a compressing conveyor driven in the same direction as said box and article holder conveyors, compressing slats carried by said compressing conveyor and extending transversely of the direction of travel of said conveyors, said slats being mounted on said compressing conveyor and the latter being so positioned that said slats respectively overlie and enter downwardly into said article holders so as to be operative to compress articles in said holders, and means operative during the travel of said conveyors for effecting movement of articles compressed in said article holders as aforesaid transversely of said conveyor travel into boxes carried by said box holders.

23. Apparatus for inserting stacks of articles into boxes, comprising a pair of conveyors arranged side by side for travel along substantially parallel paths, means simultaneously driving said conveyors at like rates of travel in the same direction, box holders on one of said conveyors, article holders on the other of said conveyors, said box holders and said article holders being mounted on the respective conveyors so that said article holders are respectively in alignment with said box holders transversely of the travel of said conveyor, a pusher movable in unison with said article and box holders and also transversely thereof for moving articles from said article holders into boxes in said box holders during the travel of said holders, a backing member for holding said boxes against endwise shifting incident to the introduction of the articles into the boxes, said backing member being terminated at a point in the travel of said holders where insertion of the articles into the boxes is completed, said pusher having a throw of sufficient length to force the filled boxes to move endwise transversely of the conveyor as an incident to a terminal portion of the operative movement of the pusher following the article inserting portion of said pusher movement, thereby to initiate displacement of the filled boxes from the box holders.

CHARLES T. BANKS.

(References on following page)

REFERENCES CITED

The following references are of record in the file of this patent:

UNITED STATES PATENTS

| Number | Name | Date |
|---|---|---|
| 1,108,696 | Casey | Aug. 25, 1914 |
| 1,247,722 | Rogers et al. | Nov. 27, 1917 |
| 1,345,926 | Harris | July 6, 1920 |
| 1,935,269 | Jones | Nov. 14, 1933 |
| 2,133,248 | Jones | Oct. 11, 1938 |
| 2,285,285 | Jones | June 2, 1942 |
| 2,380,624 | Young | July 31, 1945 |

FOREIGN PATENTS

| Number | Country | Date |
|---|---|---|
| 596,704 | Germany | May 9, 1934 |